April 2, 1957  H. K. SMITH  2,787,398
ELECTRIC OUTLET BOX WALL HOLE COVER PLATE
Filed April 27, 1953
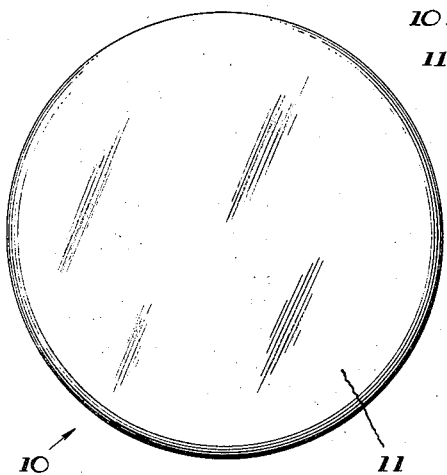
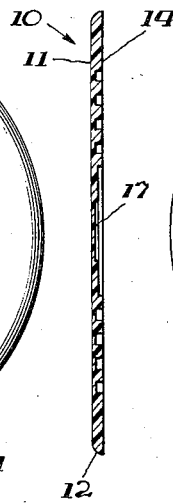
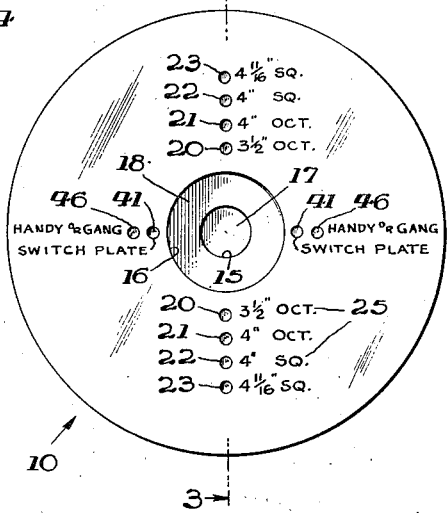
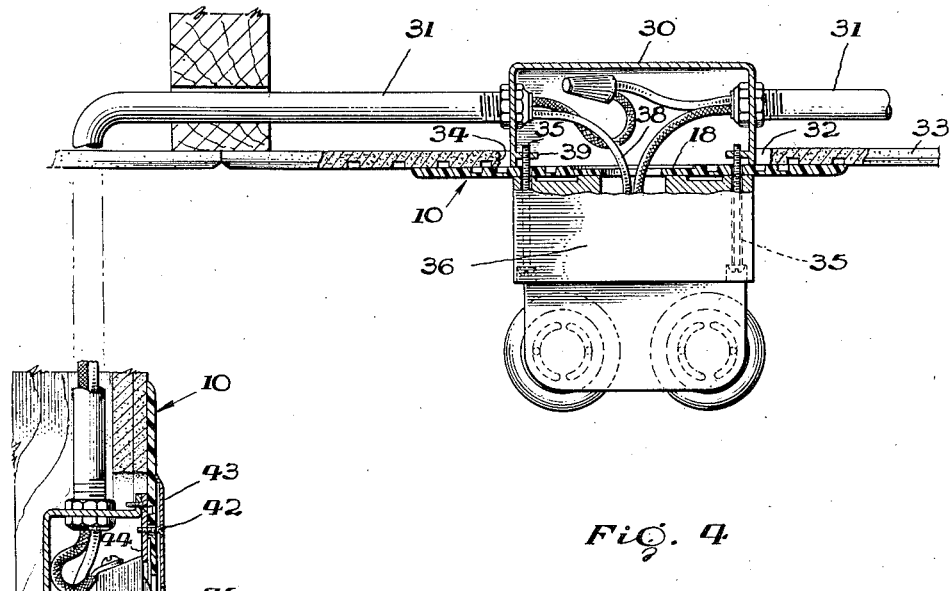
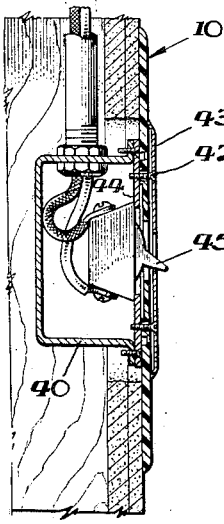
INVENTOR
Harold K. Smith
BY Gustave Miller
ATTORNEY

United States Patent Office 2,787,398
Patented Apr. 2, 1957

2,787,398
ELECTRIC OUTLET BOX WALL HOLE COVER PLATE

Harold K. Smith, Austin, Tex.

Application April 27, 1953, Serial No. 351,221

1 Claim. (Cl. 220—24.2)

This invention relates to an electric outlet box wall hole cover plate and has for an object to provide a panel for covering the unsightly edges whenever the outlet box is used as a junction box and the adjoining materials do not fit the size of the box, or when a fixture canopy is not large enough to cover the same.

Electric outlet boxes come in various standard sizes among which are the three and one-half inch octagonal, the four inch octagonal, and four inch square, and four and eleven-sixteenth square, and in addition, there are the handy or gang switch boxes of still other sizes, and when these boxes are mounted in the wall, holes have to be cut through the wall to permit the boxes to be mounted therethrough, and to permit wires to be drawn through the wall when necessary, as to a fixture or the like, or to permit a toggle switch or outlet receptacle to be available through the wall.

While the canopy for some types of fixture are often large enough to more or less conceal the opening through the wall, there are certain types of fixtures where it is not practical to provide a large size canopy, particularly the modern fluorescent fixtures which have a very small mounting means at one end thereof, usually too small to provide any concealment whatsoever.

It is an object of this invention to provide a wall cover which may fit over and conceal the ragged edges of the wall opening, irrespective of which standard size of box it is used with, and to provide this wall cover with a means so that it may readily be secured to and held in position by the outlet box mounted through the wall.

A further object of this invention is to provide a wall hole cover plate consisting of a panel having a smooth obverse face on the visible side thereof when in use, and a reverse face provided with a plurality of knockout indentations, usually in pairs, appropriate to each particular standard size of outlet box, with identifying markings at each knockout, so as to inform the electrician just which knockout is to be used for a particular size box. In addition, a central opening is provided in the reverse side, together with an appropriate knockout indentation therefore, which central knockout indentation may be left undisturbed if no wires are to be placed therethrough, but which central knockout may be easily removed when wires or other means are to be extended therethrough for electrical purposes.

This eliminates the necessity for the electrician in mounting his fixtures to attempt to fabricate any special size cover, and instead provides him with a standard wall cover, which he can fit to anyone of the several standard sizes of boxes, by merely removing the knockout indentations appropriate to the particular standard size box with which it is to be used.

Briefly, the invention includes a wall cover made of a panel of appropriate shape, usually circular but obviously of any other suitable shape, square or rectangular, for instance, with its reverse side provided with as many appropriately located knockout indentations as may be necessary to cover practically every standard size of outlet box with the knockout indentations appropriately identified both as to the shape and size of standard outlet box with which it is to be used.

With the foregoing and other objects in view, this invention comprises the combination, construction and arrangement of parts hereinafter set forth, claimed and disclosed in the accompanying drawings, wherein:

Fig. 1 is a plan view of the obverse side of the electric outlet box wall cover of this invention.

Fig. 2 is a plan view of the reverse side of Fig. 1.

Fig. 3 is a sectional view on line 3—3 of Fig. 2.

Fig. 4 is a partly fragmentary, sectional view showing the invention used in connection with an outlet box to which a fluorescent fixture is attached.

Fig. 5 is a similar view of the invention used as a wall cover in connection with a switch box.

There is shown at 10 the electric outlet box wall cover of this invention consisting of a panel member of suitable material such as molded insulating plastic material, for instance, and having a smooth face 11 whose edge may be smoothly rounded as at 12.

The reverse face 14 of the cover 10 is provided with a central opening 15 and a second central opening 16, the central opening 15 having a knockout indentation 17 and the central opening 16 having a knockout indentation 18.

In addition, there are provided a plurality of pairs of knockout indentations 20, 21, 22, and 23, each knockout indentation having appropriate identifying markings 25 giving both the size and style such as octagonal or square, and the size as 3½ inch, 4 inch, etc. These knockouts and indicia markers may be vertically aligned for convenience, as shown, but it is quite obvious that it is immaterial whether they are vertically aligned or whether they are spaced from each other about the cover, for only those knockout indentations appropriate to the particular box are used and the remainder are left untouched in each particular installation. That the vertical alignment shown is not essential, is shown by the provision of the additional knockouts, one pair identified for switch plate, and the other pair identified for handy or gang box.

In Fig. 4, the cover 10 of this invention is shown in use in connection with a 4 inch octagonal box 30 mounted between conduit pipes 31 so as to extend through an opening 32 that has been cut through a wall or ceiling 33, which may be made of acoustical tile, for instance, and hence, which is impossible to make a clean cut, but which will usually have ragged edges 34 about the opening 32. When the electrician is making this installation, knowing that he is using the 4 inch octagonal box 30, he merely knocks out the knockout indentations 21, as by placing a nail or other small tool against the inside surface thereof, and hitting it with any small weighted tool, such as a hammer or the like. Then, he merely threads the screws 35 through the fluorescent fixture 36 and the openings provided by the knockout indentations through the usual threaded ears 39 present in the box 30.

Before making this installation, of course, knowing that he will have to draw the conductor wires 38 from the conduit pipes 31 to the fixture 36 therethrough, he knocks out either the central indentation 17 or both this central indentation 17 and the larger indentation 18 to make a central opening through the cover of appropriate size. If used in connection with a switch box, as at 40, as shown in Fig. 5, a pair of knockout indentations 41 suitably identified with the words switch plate, are removed to allow the screws 42 to extend through the switch plate 43 and reach the appropriate threaded openings in the switch flange 44, which is secured to the switch box 40.

The central knockout indentation 17 is previously removed permitting the switch finger 45 to operatively extend therethrough. When used with the standard size handy or gang boxes, the knockout indentations 46, which are so labeled, will be used in the same manner.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

A circular cover for an electric outlet box of the wall or ceiling type comprised of a plate of a size larger than the largest size outlet box with which it is to be utilized, said plate having a completely smooth and unbroken front side and a rear side, said front side having a rounded rim terminating at the rear side, said rear side having a pair of centrally disposed concentric recesses of different depths and diameters, knockouts closing said recesses, said rear face having additional pairs of radially aligned spaced recesses having knockouts fixed therein, said pairs of recesses providing means whereby when selected knockouts are removed screws may be passed through the apertures to engage with a selected size outlet box, indicia adjacent each aperture indicative of the size outlet box applicable to the selected aperture, whereby the face of the plate remains ostensibly unbroken except for the concealed screw containing apertures.

References Cited in the file of this patent

UNITED STATES PATENTS

| | | |
|---|---|---|
| 832,509 | Slocum | Oct. 2, 1906 |
| 1,237,501 | Goggin | Aug. 21, 1917 |
| 1,824,299 | Rountree | Sept. 22, 1931 |
| 2,132,098 | Clatworthy | Oct. 4, 1938 |

OTHER REFERENCES

Publication: V-N Fittings, published by B. A. Vandy, Rochester, N. Y. (Last page only of publication relied upon.)